US011795922B2

(12) United States Patent
Krausche et al.

(10) Patent No.: US 11,795,922 B2
(45) Date of Patent: Oct. 24, 2023

(54) WIND TURBINE, METHOD FOR ASSEMBLING A TRANSFORMER AND WIND TURBINE NACELLE

(71) Applicant: Wobben Properties GmbH, Aurich (DE)

(72) Inventors: Thomas Krausche, Aurich (DE); Ihno Coordes, Ihlow (DE); Frank Knoop, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/896,688

(22) Filed: Aug. 26, 2022

(65) Prior Publication Data

US 2023/0064535 A1    Mar. 2, 2023

(30) Foreign Application Priority Data

Aug. 27, 2021 (EP) ................................. 21193580

(51) Int. Cl.
*F03D 80/80* (2016.01)
*F03D 13/10* (2016.01)

(52) U.S. Cl.
CPC ............. *F03D 80/82* (2016.05); *F03D 13/10* (2016.05)

(58) Field of Classification Search
CPC .......... F03D 80/80; F03D 80/82; F03D 13/10; F05B 2230/61; F05B 2240/14; B66D 1/60

See application file for complete search history.

(56) References Cited

U.S. PATENT DOCUMENTS

| 8,922,038 | B2 * | 12/2014 | Bywaters | F03D 13/20 290/44 |
| 9,514,874 | B2 * | 12/2016 | Gaard | H01F 27/025 |
| 11,300,105 | B2 * | 4/2022 | Kofman | F03D 80/50 |
| 2012/0146335 | A1 * | 6/2012 | Bywaters | F03D 80/82 290/55 |
| 2015/0061803 | A1 * | 3/2015 | Gaard | H01F 27/12 336/59 |
| 2017/0045038 | A1 | 2/2017 | Nyvad et al. | |
| 2018/0283359 | A1 * | 10/2018 | Senthoorpandian | F03D 80/50 |
| 2020/0072184 | A1 | 3/2020 | Taubenrauch et al. | |
| 2020/0182223 | A1 * | 6/2020 | Cingolani | F03D 80/80 |

(Continued)

FOREIGN PATENT DOCUMENTS

| EP | 1101934 A2 | 5/2001 |
| EP | 3372823 A1 | 9/2018 |

(Continued)

*Primary Examiner* — Eldon T Brockman
(74) *Attorney, Agent, or Firm* — SEED INTELLECTUAL PROPERTY LAW GROUP LLP

(57) ABSTRACT

A wind turbine with a nacelle with a nacelle floor is thus provided. The wind turbine further has an aerodynamic rotor with at least two rotor blades. The wind turbine further has a tower, on which the nacelle is arranged. At least one first and second opening are provided in the nacelle floor. The first opening is used to transport first components of the wind turbine, and has corresponding first dimensions. The second opening has second dimensions, and is used to transport a transformer into the nacelle. The transformer has a floor that closes the second opening when the transformer has been conveyed through the second opening into the nacelle and mounted in the nacelle.

6 Claims, 7 Drawing Sheets

(56) References Cited

U.S. PATENT DOCUMENTS

2020/0362824 A1* 11/2020 Kofman .................. F03D 80/50
2021/0277871 A1* 9/2021 Jensen .................... F03D 13/10

FOREIGN PATENT DOCUMENTS

| KR | 10-2010-0077744 A | 7/2010 |
|----|-------------------|--------|
| WO | 2011/012683 A2 | 2/2011 |
| WO | 2019/100146 A1 | 5/2019 |

* cited by examiner

WIND TURBINE, METHOD FOR ASSEMBLING A TRANSFORMER AND WIND TURBINE NACELLE

BACKGROUND

Technical Field

The present invention relates to a wind turbine, a method for assembling a transformer, as well as a wind turbine nacelle.

Description of the Related Art

A wind turbine typically has a tower, a nacelle as well as an aerodynamic rotor with several rotor blades. The nacelle typically has the electrical generator as well as other electrical and/or electronic components. In some cases, a transformer is also provided in the nacelle.

In order to transport components provided in the nacelle, EP 1 101 934 A4 exemplarily describes a nacelle of a wind turbine with a closable opening in the nacelle, so as to convey components through this opening into the nacelle. For example, such components are a drive or a generator. Therefore, the size of the opening must be adjusted to the size of the component to be maximally transported.

BRIEF SUMMARY

Provided is a wind turbine as well as a wind turbine nacelle, which allows an improved transport of components to the nacelle.

Provided is a wind turbine with a nacelle with a nacelle floor. The wind turbine further has an aerodynamic rotor with at least two rotor blades and a tower, on which the nacelle is arranged. At least one first and second opening is provided in the nacelle floor. The first opening is used to transport first components of the wind turbine, and has corresponding first dimensions. The second opening has second dimensions, and is used to transport a transformer into the nacelle. The transformer has a floor that closes the second opening when the transformer has been conveyed through the second opening into the nacelle and mounted in the nacelle. As a consequence, the transformer can be transported into the interior of the nacelle from the floor through the second opening (transformer opening).

According to an aspect, the transformer has a transformer (oil)pan. For example, the floor of the transformer can here be designed as an (oil)pan. Alternatively thereto, a transformer (oil)pan can be provided in addition to the floor of the transformer. Providing the transformer (oil)pan is advantageous, since it can ensure that any leaking liquids will not cause any damage to the environment. If the (oil)pan constitutes the transformer floor or is connected with the separate transformer floor, the transformer can be changed out together with the (oil)pan.

For example, the transformer pan can be designed as an oil pan.

According to another aspect, the transformer floor can be provided in or on the nacelle floor in the area of the second opening by means of fastening elements. As a result, a reliable and detachable fastening of the transformer can be provided in or on the nacelle floor.

According to another aspect, the dimensions of the transformer floor are adjusted to the dimensions of the second opening, so that the transformer can be lifted or conveyed through the second opening into the nacelle interior.

Provided is a method for assembling a transformer in a wind turbine nacelle. The transformer with the transformer floor is lifted, and conveyed through the nacelle floor with a first and second opening. The transformer is here lifted or conveyed through the second opening into the interior of the nacelle. The transformer is locked, so that the transformer floor closes the second opening.

Provided is a wind turbine nacelle with a nacelle floor with a first and second opening. The first opening has dimensions that allow first components to be passed through. The second opening is larger than the first opening, and has dimensions that allow the transformer to be passed through.

According to an aspect, the transformer floor can constitute part of the nacelle floor.

Provided is a transformer with a transformer floor, which is adjusted to the dimensions of the second opening, so that the transformer floor closes the second opening when the transformer has been mounted inside of the nacelle. In order to change out the transformer, the transformer must then only be lowered down through the second opening. A locking element or fastening element can be provided in or on the transformer floor, and makes it possible to lock the transformer floor in or on the nacelle floor. The transformer can optionally have a transformer tray.

BRIEF DESCRIPTION OF THE SEVERAL VIEWS OF THE DRAWINGS

Advantages and exemplary embodiments of the invention will be explained in more detail below with reference to the drawing.

DETAILED DESCRIPTION

Figure 1:
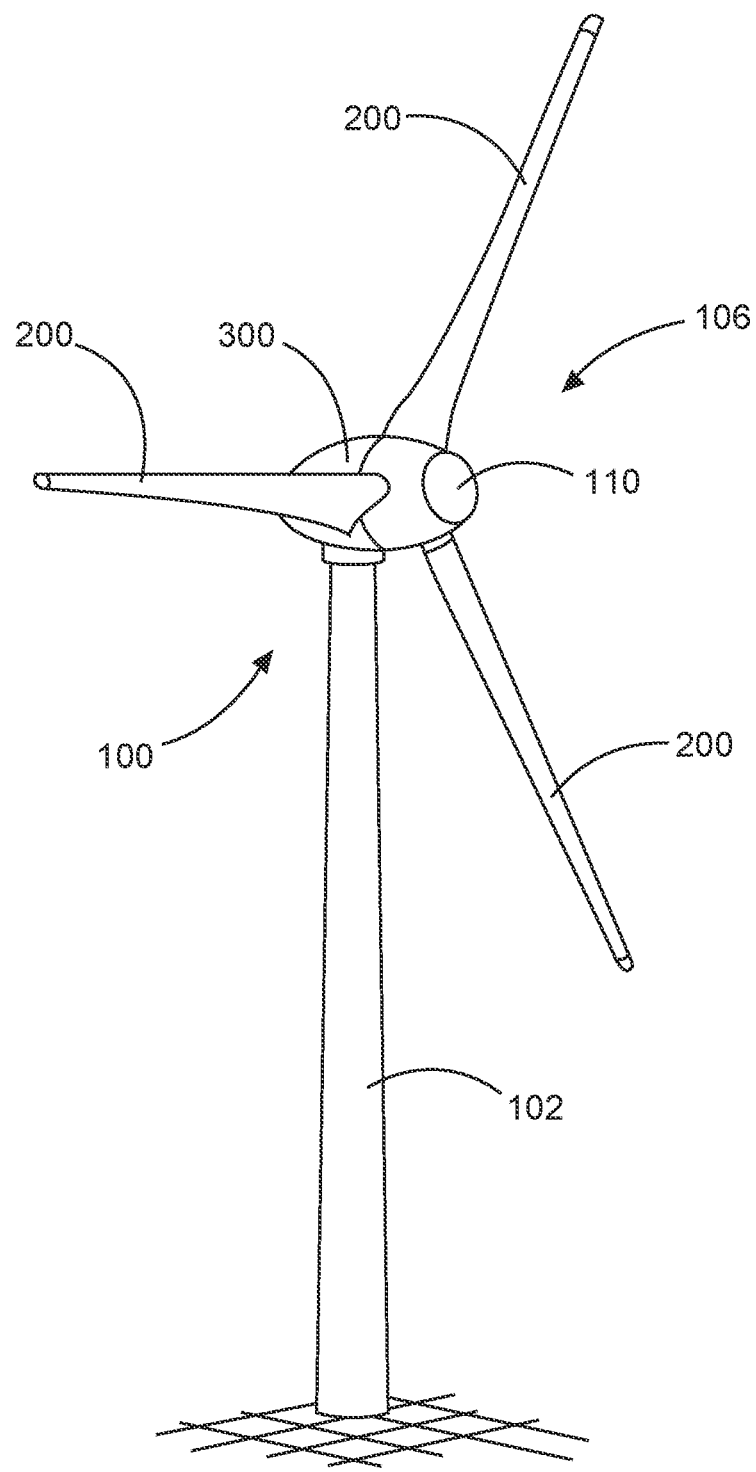
FIG. 1 shows a schematic illustration of a wind turbine according to the invention.

FIG. 1 shows a schematic illustration of a wind turbine according to the invention. The wind turbine 100 has a tower 102 and a nacelle 300 on the tower 102. An aerodynamic rotor 106 with three rotor blades 200 and a spinner 110 is provided on the nacelle 300. The aerodynamic rotor 106 is made to rotate by the wind during operation of the wind turbine, and thus also rotates a rotor or runner of a generator, which is directly or indirectly coupled with the aerodynamic rotor 106. The electric generator is arranged in the nacelle F300, and generates electrical energy. The pitch angles of the rotor blades 200 can be changed by pitch motors on the rotor blade roots of the respective rotor blades 200.

Figure 2:
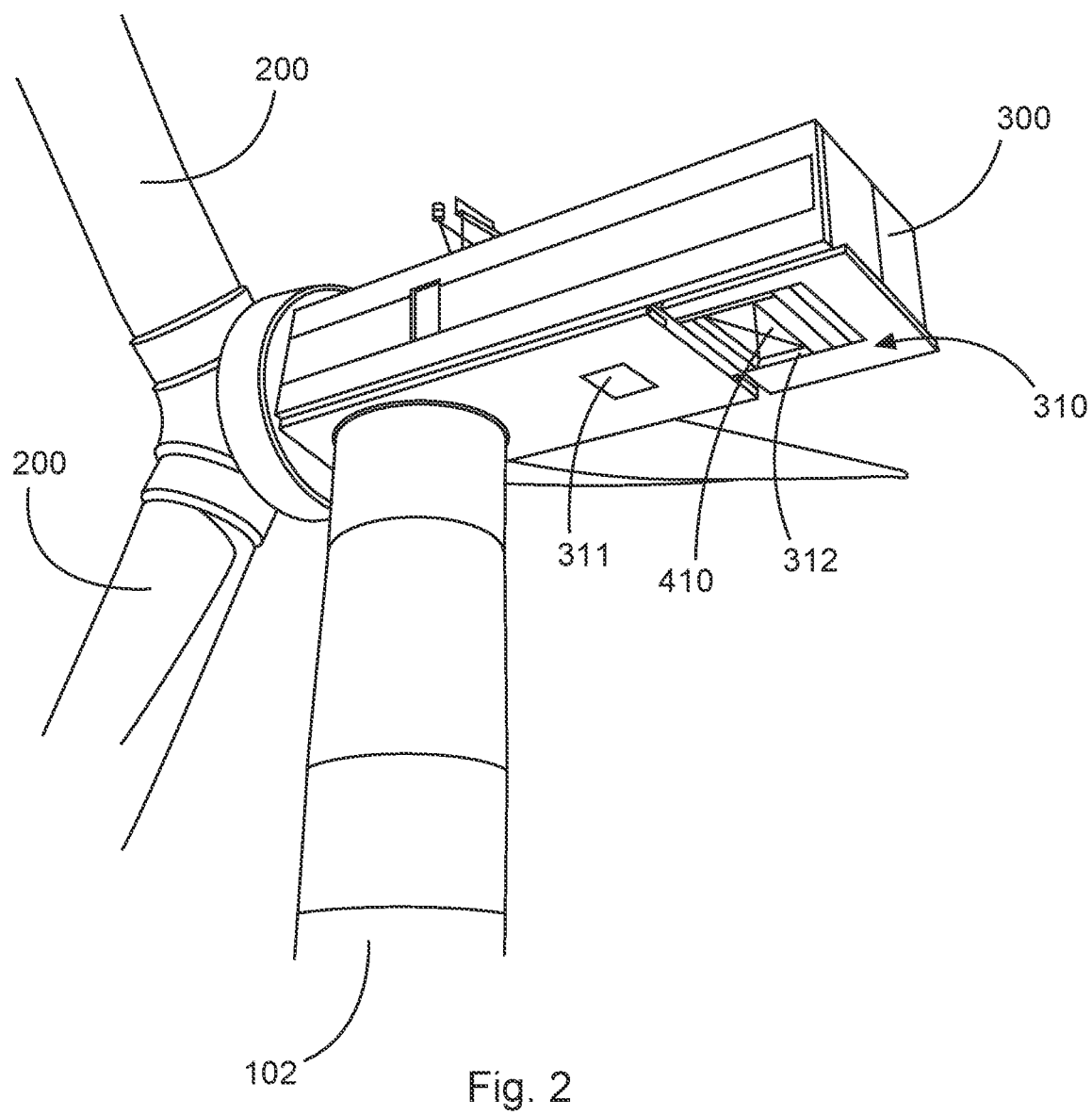
FIG. 2 shows another perspective view of a nacelle of a wind turbine according to a first exemplary embodiment.
Figure 3:
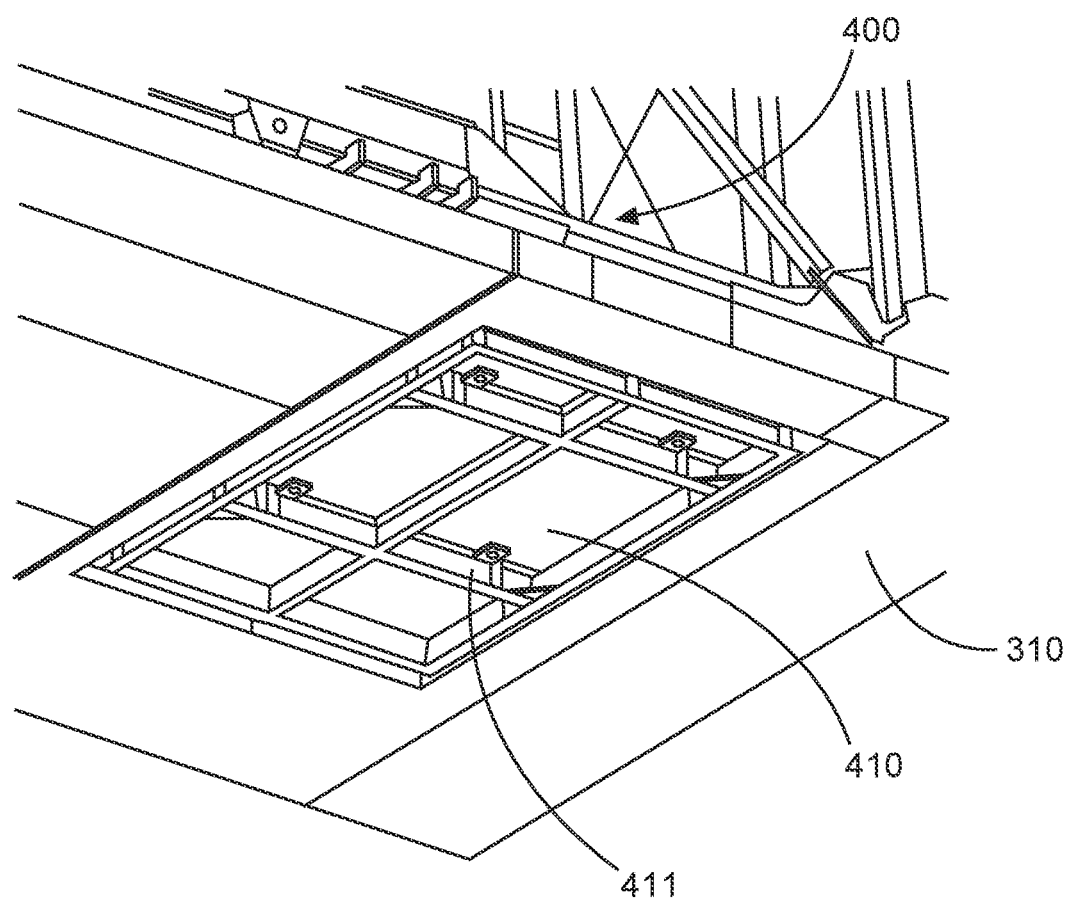
FIG. 3 shows a perspective view of a nacelle floor of a nacelle according to a second exemplary embodiment.

FIG. 2 shows another perspective view of a nacelle of a wind turbine according to a first exemplary embodiment. The nacelle 300 is provided on a tower 102, and coupled with the aerodynamic rotor with the rotor blades 200. The nacelle 300 has an electric generator, which is directly or indirectly connected with the aerodynamic rotor 106. The nacelle 300 can further have power electronics modules, for example rectifiers and inverters. In addition, the nacelle 300 can have a transformer 400 (FIG. 3). The nacelle 300 has a nacelle floor 310 with a first opening 311 and a second opening 312. The first opening 311 is smaller than the second opening 312. The first opening 311 has first dimensions, and is used to convey components of the wind turbine into the interior of the nacelle, for example by means of a winch. The second opening 312 has second dimensions, and is used to convey a transformer 400 of the wind turbine into the interior of the nacelle, for example also by means of a winch. The second opening 312 is then closed by a floor 410 of the transformer once the transformer has been mounted in the nacelle 300. The floor 410 of the transformer 400 thus forms a seal of the opening 312. This is advantageous, since no additional hatch is thus required for closing the second opening 312.

In order to assemble the transformer 400, the transformer 400 need only be upwardly transported, for example by means of a winch that can be provided inside of the nacelle 300. The transformer 400 is then transported through the second opening 312 into the interior of the nacelle 300. After the transformer 400 has been transported into the nacelle 300, the floor 410 of the transformer 400 can be fastened by means of a locking or fastening unit, so that the floor 410 of the transformer 400 (downwardly) closes the second opening 312. This is advantageous in particular for assembling the transformer 400, because the transformer 400 need no longer be further transported inside of the nacelle, but instead can be mounted only at the location where it was lifted through the second opening 312.

In order to assemble a transformer 400 in a nacelle 300 of a wind turbine 100, the transformer 400 must be lifted upward, for example by means of a winch. It is here lifted through a second opening 312 in the nacelle floor 310 into the interior of the nacelle 300. The transformer 400 is subsequently locked, so that the floor of the transformer 400 closes the opening 312 in the nacelle floor 310.

Figure 5:
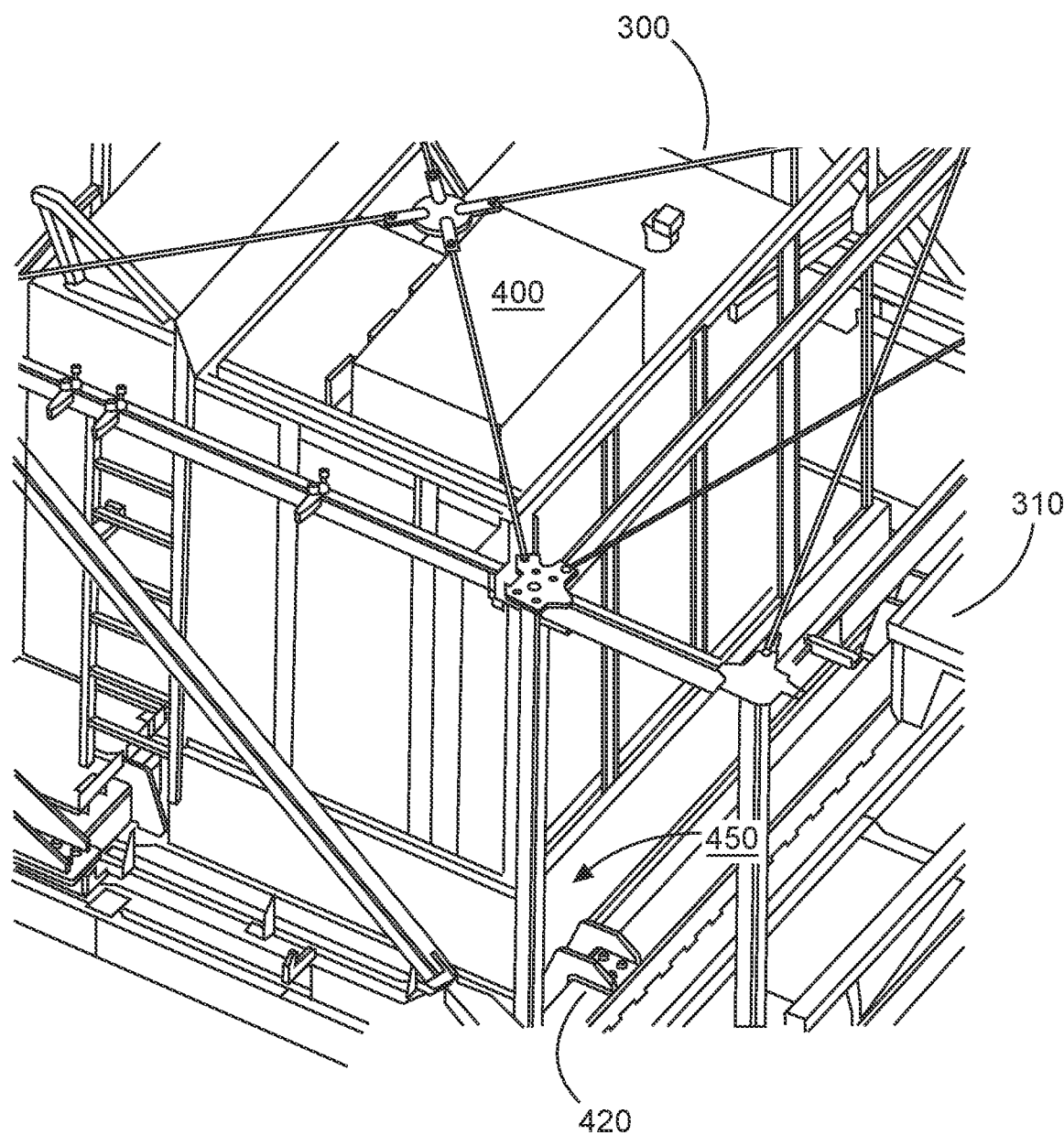
FIG. 5 shows a schematic illustration of a transformer in the interior of a nacelle of a wind turbine.

The transformer 400 can optionally have a tray 450 (FIG. 5). The floor 410 of the transformer 400 can here be designed as a tray 450. Alternatively thereto, a tray can be provided in addition to the floor.

FIG. 3 shows a perspective view of a nacelle floor of a nacelle according to a second exemplary embodiment. In particular, FIG. 3 provides the nacelle floor 310, a transformer 400 inside of the nacelle 300, and a transformer floor 410 that closes the second opening 312.

The floor 410 can optionally have a plurality of struts 411. For example, these struts 411 can be used to increase the stability of the transformer floor.

Figure 4:
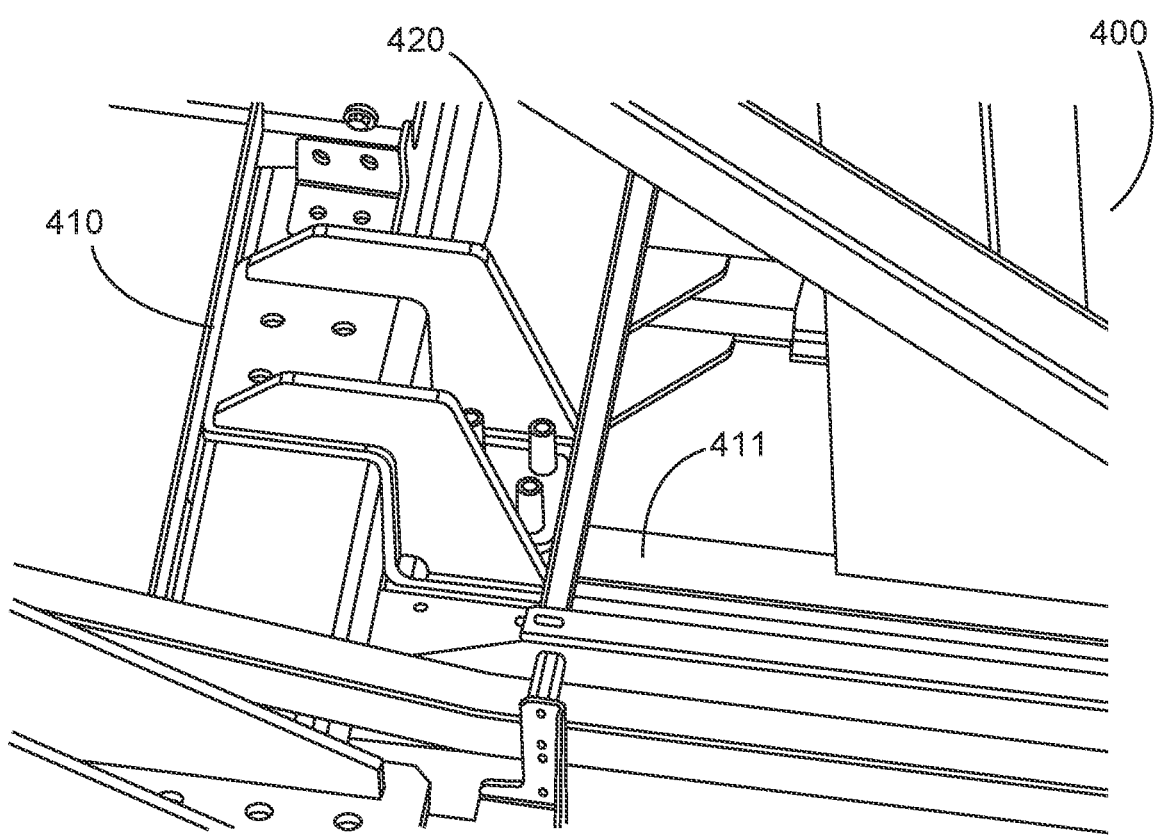
FIG. 4 shows a schematic view of a cutout of a nacelle floor according to a third exemplary embodiment.

FIG. 4 shows a schematic view of a cutout of a nacelle floor according to a third exemplary embodiment. Visible on FIG. 4 is the transformer 400 with the struts 410 during installation in the nacelle. For example, the transformer floor 410 can be fastened in or on the nacelle floor 310 by means of a fastening unit 420 (fastener). Several struts or cross-struts can optionally be provided in the area of the nacelle floor 310 for stiffening the nacelle floor 310. The fastening units can here engage into the struts, so as to hold the transformer securely in or on the second opening 312.

Because the transformer floor constitutes part of the nacelle floor, it can also be used as a heat exchanger, since the transformer floor is directly exposed to weather effects.

FIG. 5 shows a schematic illustration of a transformer in a nacelle of a wind turbine. The transformer 400 is arranged inside of the nacelle 300. In particular, the transformer 400 is fastened to or on the nacelle floor 310, for example by means of fastening units 420 (for example, as shown on FIG. 4). The transformer 400 has a transformer floor 410 and optionally a transformer tray 450. In the exemplary embodiment on FIG. 5, the transformer tray 450 is designed separately from the transformer floor 410. Alternatively thereto, the transformer floor 410 can also be designed as a transformer tray 450. The transformer 400 thus stands inside of the transformer tray 450. This is advantageous, since any liquids that might exit the transformer 400 cannot cause any damage to the environment, because they can be collected in the transformer tray 450.

According to an aspect, the transformer 400 can be changed out together with the transformer tray 450. In addition, the transformer 400 can be mounted together with the transformer tray 450 by conveying the transformer 400 together with the transformer tray 450 through the second opening 312 into the interior of the nacelle 300.

Figure 6:
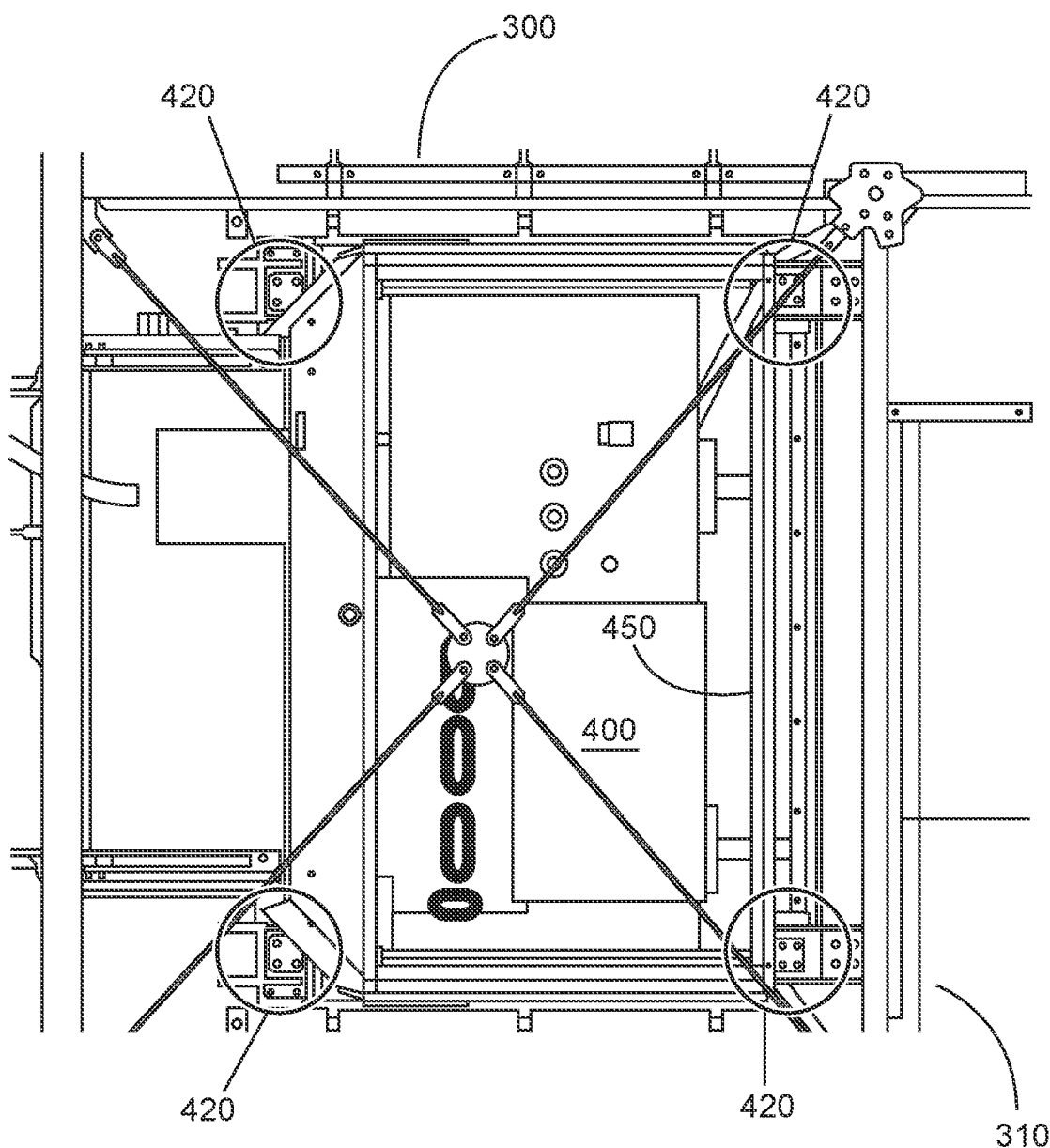
FIG. 6 shows a top view of a transformer in the interior of a nacelle.
Figure 7:
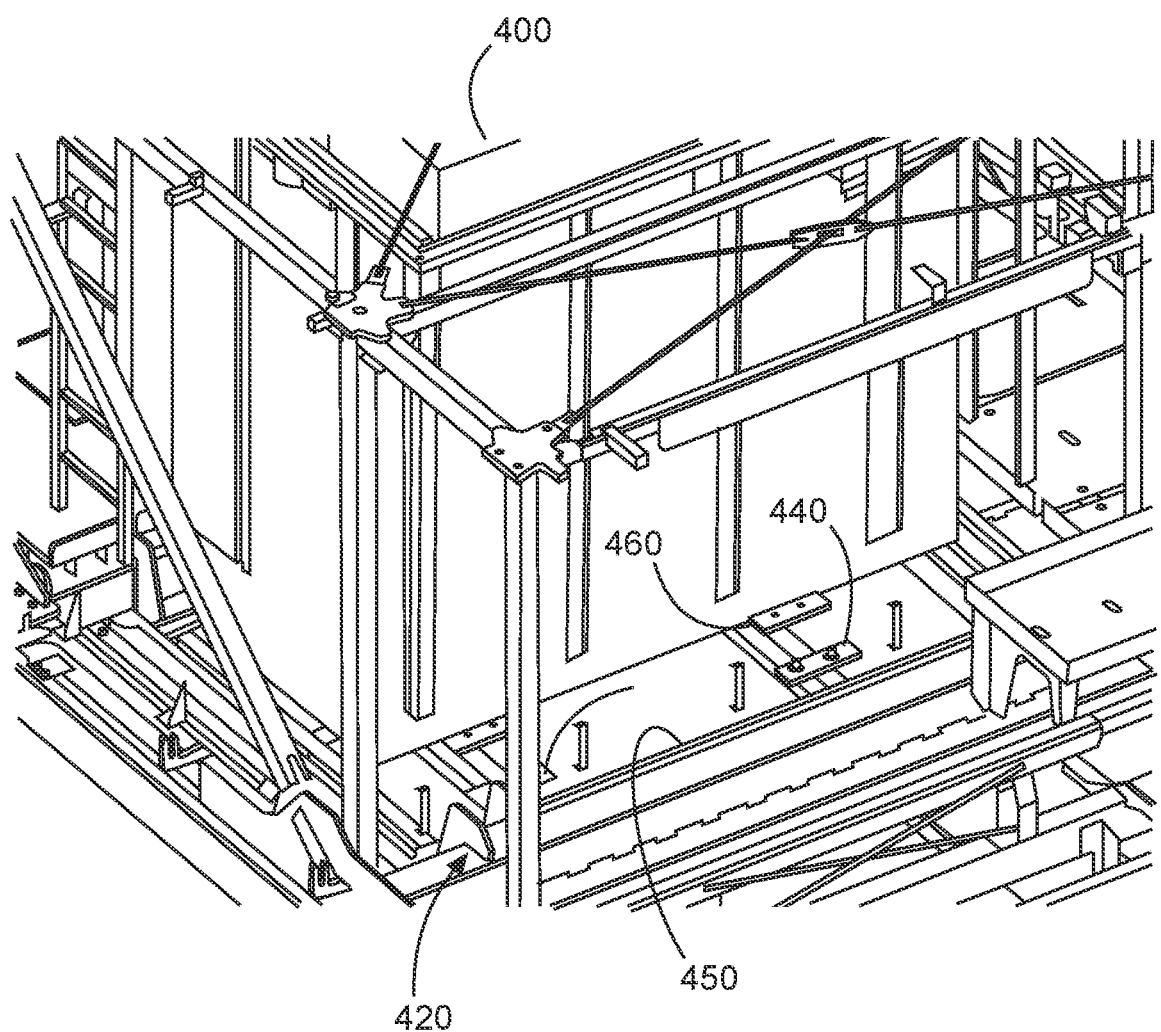
FIG. 7 shows a schematic illustration of a transformer during assembly in a nacelle of a wind turbine.

FIG. 6 shows a top view of the transformer inside of the wind turbine on FIG. 5, and FIG. 7 shows a schematic illustration of a transformer during assembly in a nacelle of a wind turbine. The transformer 400 is located inside of a transformer tray 450. The transformer 400 together with the transformer tray 450 is fastened in or on the nacelle floor 310 by means of fastening units 420. Additional possibilities can optionally be provided for fastening the transformer 400 in or on the nacelle floor 310.

For example, the fastening units 420 can be designed as a connecting flange. This connecting flange can be used to fasten the transformer 400 to a nacelle floor 310. To this end, the nacelle floor 310 can optionally have a steel structure (for example, as shown on FIG. 4). The transformer 400 can have a plurality of connecting plates 460, by means of which the transformer 400 is screwed to a transformer frame 411 inside of the transformer tray 450, for example, using additional plates 440.

REFERENCE LIST

100 Wind turbine
102 Tower
106 Rotor
110 Spinner
200 Rotor blades
300 Nacelle
310 Nacelle floor
311 Opening
312 Opening
400 Transformer
410 Floor
411 Struts
420 Fastening unit
440 Plates
450 Tray
460 Connecting plates The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine, comprising:
   a tower, a nacelle on the tower,
wherein the nacelle has a nacelle floor with a first opening and a second opening,
wherein the first opening has dimensions that allow first components to be passed through,
wherein the second opening is larger than the first opening, and
a transformer with a transformer floor inside of the nacelle,
wherein the second opening has dimensions that allow the transformer to be passed through,
wherein the transformer floor is a lowest part of the transformer, and wherein the transformer floor closes the second opening when the transformer has been mounted in the nacelle such that the transformer is enclosed by the nacelle.

2. The wind turbine according to claim 1, wherein the transformer floor is provided in or on the nacelle floor in an area of the second opening by fasteners.

3. The wind turbine according to claim 1, wherein dimensions of the transformer floor are adjusted to the dimensions of the second opening, so that the transformer can be lifted through the second opening into the nacelle interior.

4. The wind turbine according to claim 1, wherein the transformer has a tray.

5. A method for assembling a transformer in a wind turbine nacelle, the method comprising:
lifting a transformer with a transformer floor, wherein the transformer floor is a lowest part of the transformer,
conveying the transformer through a nacelle floor with a first opening and a second opening, wherein the transformer is conveyed through the second opening into an interior of the nacelle, and
locking the transformer in position such that the transformer floor closes the second opening,
wherein the transformer is enclosed by the wind turbine nacelle.

6. A wind turbine nacelle, comprising:
a nacelle floor with a first opening and a second opening,
wherein the first opening has dimensions that allow first components to be passed through,
wherein the second opening is larger than the first opening, and
wherein the second opening has dimensions that allow a transformer to be passed through, and
a transformer located inside the wind turbine nacelle, wherein a lowest part of the transformer is located in the wind turbine nacelle and covers the second opening.

* * * * *